UNITED STATES PATENT OFFICE.

ALBERT COBENZL, OF BINGEN, GERMANY.

SILVER BROMID GELATIN AND PROCESS OF MAKING SAME.

SPECIFICATION forming part of Letters Patent No. 718,312, dated January 13, 1903.

Application filed June 30, 1902. Serial No. 113,842. (No specimens.)

*To all whom it may concern:*

Be it known that I, ALBERT COBENZL, a subject of the Emperor of Austria-Hungary, residing at Bingen-on-the-Rhine, Germany, have invented certain new and useful Improvements in Silver Bromid Gelatin and Processes of Making the Same; and I do hereby declare the following to be a full, clear, and exact description of the invention, such as will enable others skilled in the art to which it appertains to make and use the same.

In order to make a sensitive silver bromid gelatin which does not cloud, it has often been proposed to add alcohol during the emulsification or to precipitate it with alcohol. As, however, by this procedure the silver bromid gelatin is always precipitated in larger or smaller lumps or is chilled into a stiff condition and must in order to be washed be made finer, the washing operation is natually inconvenient, and by reason of irregular reduction in size of particles the gelatin is insufficiently and imperfectly washed, especially when the washing operation is not done with great care and for a sufficient time. The silver bromid gelatin so obtained does not always exhibit the desired qualities. According to the herein-described process all these difficulties are avoided and a product is always without failure obtained in an easily-washable form, which product possesses an even degree of sensitiveness and all desirable qualities.

According to this invention this result is attained by preparing an emulsion liquid with alcohol or similar substances in such a manner that the gelatin or the like at the temperature necessary to its preparation remains in a perfectly clear solution. After maturing or ripening of the emulsion it is cooled to about 13° to 14° centigrade—say 52° to 57° Fahrenheit—with simultaneously stirring briskly, so that the silver bromid gelatin is separated as a heavy sandy powder. As the thus obtained powder precipitates rapidly, it can readily be separated from the clear solution containing the soluble salts and easily and perfectly obtained in a pure state by washing. An emulsion thus obtained has, further, the advantages that with equal sensitiveness compared with the emulsions prepared by the present employed processes it has a much finer grain. It is sensitive to a greater range of the prismatic colors, especially green, orange, and red—that is, the emulsion prepared according to the herein-described process has especially good panchromatic qualities. The two above-named properties, to which are due a finer-grained silver bromid gelatin, are especially valuable in microphotography, astronomy, and projection.

An example of one manner of carrying out the process is here given. One hundred and fifty grams of gelatin or the like are swelled in two thousand five hundred cubic centimeters of water, then fully dissolved therein by heating, and to the thus obtained solution there are added six hundred cubic centimeters of the following solutions: two hundred and ninety grams of calcium bromid, one thousand five hundred cubic centimeters of ninety to ninety-five per cent. alcohol, and six hundred cubic centimeters of the following solution: two hundred and twenty grams of silver nitrate, three hundred cubic centimeters of water, six hundred cubic centimeters of ninety to ninety-five per cent. alcohol. This mixture is allowed to ripen or mature at from 60° to 80° centigrade, or, say, 140° to 176° Fahrenheit, for about from one to three hours, according to the degree of sensitiveness desired, and is then rapidly cooled by vigorous stirring. At a temperature of about 12° to 14° centigrade, or, say, 54° to 57° Fahrenheit, the silver bromid gelatin precipitates as a fine sandy powder and can be fully separated and obtained in a pure state by decanting, filtering or the like, and washing.

The addition of the usually-employed substances, as bromid salts, (also, if desired, alkaline carbonates,) renders the emulsion ready for flowing on plates, paper, &c. The silver bromid gelatin thus prepared is a fine-grained powder that swells in cold water, but does not dissolve therein; is, however, soluble in warm water. It is insoluble in alcohol, ether, or benzol. A specially characteristic property of this silver bromid gelatin and of the herein-described process is that the gelatin, while possessing the same sensitiveness as those made by other methods, has an essentially finer grain and is sensitive to a greater range of the spectral colors, so that it is nearly absolutely panchromatic.

Having now particularly described my invention, what I claim, and desire to secure by Letters Patent, is—

1. A process for the manufacture of silver bromid gelatin, which consists in subjecting the solution of the emulsion in a hot state to the action of alcohol, then allowing it to ripen, then cooling it by agitation so that the silver bromid gelatin precipitates from the clear liquid which contains the soluble salts, as a fine-grained sandy powder, and then separating the same and washing.

2. Silver bromid gelatin consisting of a precipitated powder with a very fine grain being nearly panchromatic.

In testimony that I claim the foregoing as my invention I have signed my name in presence of two subscribing witnesses.

ALBERT COBENZL. [L. S.]

Witnesses:
 EDWARD MIES,
 WALTER HANSING.